(12) United States Patent
Agutter et al.

(10) Patent No.: US 6,382,334 B1
(45) Date of Patent: May 7, 2002

(54) POWER DRIVE UNIT FOR A GOLF TROLLEY

(75) Inventors: David George Agutter, Wingerworth; Andrew Martin Thompson, Penshurst, both of (GB)

(73) Assignee: Powermade Designs Ltd. (GB)

( * ) Notice: Subject to any disclaimer, the term of this patent is extended or adjusted under 35 U.S.C. 154(b) by 0 days.

(21) Appl. No.: 09/676,926

(22) Filed: Oct. 2, 2000

(30) Foreign Application Priority Data

Jun. 27, 2000 (GB) .............................................. 0015591

(51) Int. Cl.⁷ .............................. B62D 51/06; B60K 1/04
(52) U.S. Cl. ........................ 180/19.1; 180/10; 180/20; 180/21; 180/65.5; 280/DIG. 5; 280/DIG. 7
(58) Field of Search ............................... 180/19.1, 19.3, 180/20, 65.5, 65.6, 65.7, 65.1, 381, 228, 359, 361, 907, 908, 10, 21; 74/409, 411; 280/DIG. 5, DIG. 6, DIG. 7

(56) References Cited

U.S. PATENT DOCUMENTS

| | | | | |
|---|---|---|---|---|
| 4,096,919 A | * | 6/1978 | Thompson | .................. 180/21 |
| 4,195,947 A | * | 4/1980 | Lambertz | .................. 180/65.5 |
| 4,979,582 A |   | 12/1990 | Forster | |
| 6,100,615 A | * | 8/2000 | Birkstran | .................. 180/65.5 |

FOREIGN PATENT DOCUMENTS

| | | | | |
|---|---|---|---|---|
| GB | 1270532 |   | 4/1972 | |
| GB | 2201386 | * | 9/1988 | ................ 180/65.5 |
| GB | 2224984 |   | 5/1990 | |
| JP | 405319327 | * | 12/1993 | ................ 180/65.5 |
| SU | 1258716 | * | 9/1986 | ................ 180/65.5 |

* cited by examiner

Primary Examiner—Anne Marie Boehler
(74) Attorney, Agent, or Firm—Trexler, Bushnell, Giangiorgi, Blackstone & Marr, Ltd.

(57) ABSTRACT

A power drive unit (1) for attachment to a golf trolley comprises a drum (2) rotatable about a generally horizontal axis (3) with the external periphery (4) of the drum (2) adapted to seat on the ground and to make frictional contact with the ground for drive purposes, a battery (16) within the drum (2), an electric motor (19) powerable from the battery (16), a transmission from the drive motor (19) to the drum (2), manually operable control means for controlling forward rotation of the drum (2), an end cap (5) at each end of the drum (2), and a final output gear (25) mechanically connected to one end cap (5) via a vibration isolating connection (26, 28, 29).

15 Claims, 4 Drawing Sheets

POWER DRIVE UNIT FOR A GOLF TROLLEY

FIELD OF THE INVENTION

This invention relates to a drive unit for attachment to a golf trolley whereby the user may achieve powered drive of the trolley, by suitable operation of controls.

BACKGROUND OF THE INVENTION

Powered drive units for attachment to golf trolleys (so as to motorise an industry-standard push-pull golf trolley) are known. One unit comprises a battery power source to an internal geared drive but was subject to reliability problems with the gear wheels, as well as emitting an unacceptable level of noise.

OBJECT OF THE INVENTION

A basic object of the present invention is the provision of an improved power drive unit for attachment to a golf trolley.

SUMMARY OF THE INVENTION

According to the invention there is provided a power drive unit for attachment to a golf trolley comprising:

(i) a drum rotatable about a generally horizontal axis with the external periphery of the drum adapted to seat on the ground and to make frictional contact with the ground for drive purposes, (ii) a battery within the drum, (iii) an electric drive motor powerable from the battery, (iv) a transmission from the drive motor to the drum, (v) manually operable control means for controlling forward rotation of the drum, (vi) an end cap at each end of the drum, and (vii) a final output gear mechanically connected to one end cap via a vibration isolating connection.

ADVANTAGES OF THE INVENTION

The purpose of isolating the final output gear from the end cap is to maintain alignment of this gear when the end cap (and drum to which it is affixed) flexes whilst negotiating rough terrain as frequently occurs when the drive unit negotiates a golf course. This maintains the centre distance between other gears making up speed reduction drive train from the electric motor and prevents the noise caused by this parameter changing during each revolution. In addition any vibration present on the output gear is not transmitted to the end cap which adds to the quietness of operation.

A certain amount of mechanical shock isolation from the outside world to the drive train is also created by this system.

PREFERRED OR OPTIONAL FEATURES OF THE INVENTION

An air gap is provided between the final output gear and the mechanically connected end cap, which air gap minimises any noise transmission from the interior of the drum to the outside.

A yoke bridges co-axial stub shafts co-axial by which yoke the unit is attachable to a golf trolley.

The yoke comprises a top plate, and a pair of side arms.

The top plate incorporates a centering block and a clamp.

The battery is a lead/acid battery.

The battery is carried within the drum by a chassis and secured therein by at least one battery strap.

The chassis is carried by the stub shafts, which project from end walls of the chassis and passing one through each end cap of the drum to be attached to a terminal end of one of each side arms of the yoke.

The chassis also carries the electric motor, a speed controller, and a relay.

The electric motor has an output shaft carrying a pulley to a belt of a first stage of the transmission, the belt driving an idler gear rotatably mounted on a pin carried by one side wall of the chassis, the idler gear having a spur gear in mesh with the output gear, to form a second stage of the transmission.

The gears of acetal copolymer.

The mechanical connection of the end cap to the final output gear is by drive pegs of one member engaging recesses of the other.

The isolating connection comprises a ring or sleeve of resilient material, mounted on each peg and engageable with at least a portion of the associated recesses.

The resilient ring or sleeve is of neoprene, rubber.

The manually operable control means also controls reverse rotation of the drum.

BRIEF DESCRIPTION OF THE DRAWINGS

The invention will now be discussed in greater detail, by way of example, with reference to the accompanying diagrammatic drawings, in which.

Figure 1:
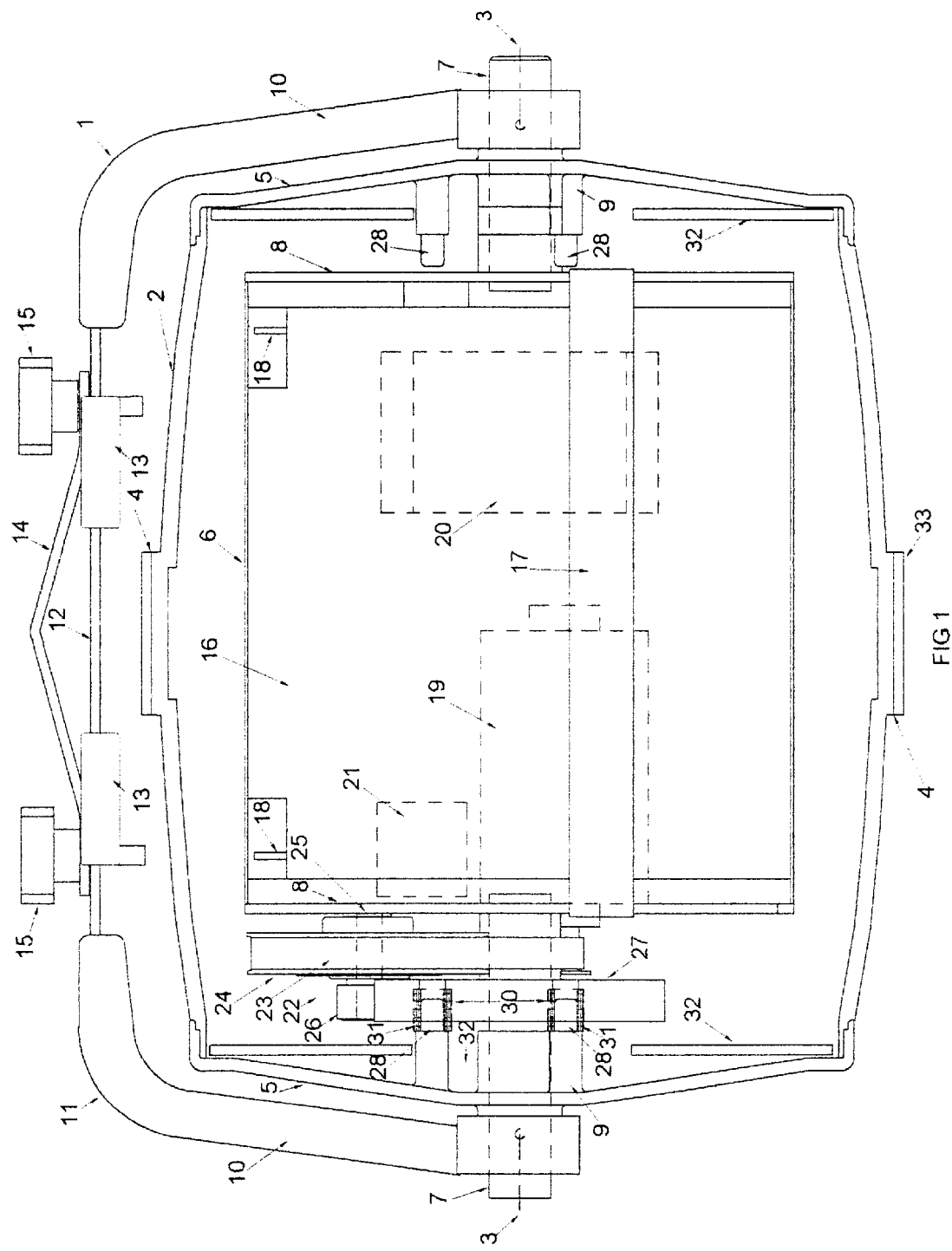
FIG. 1 is a sectional view through the drive unit.
Figure 2:
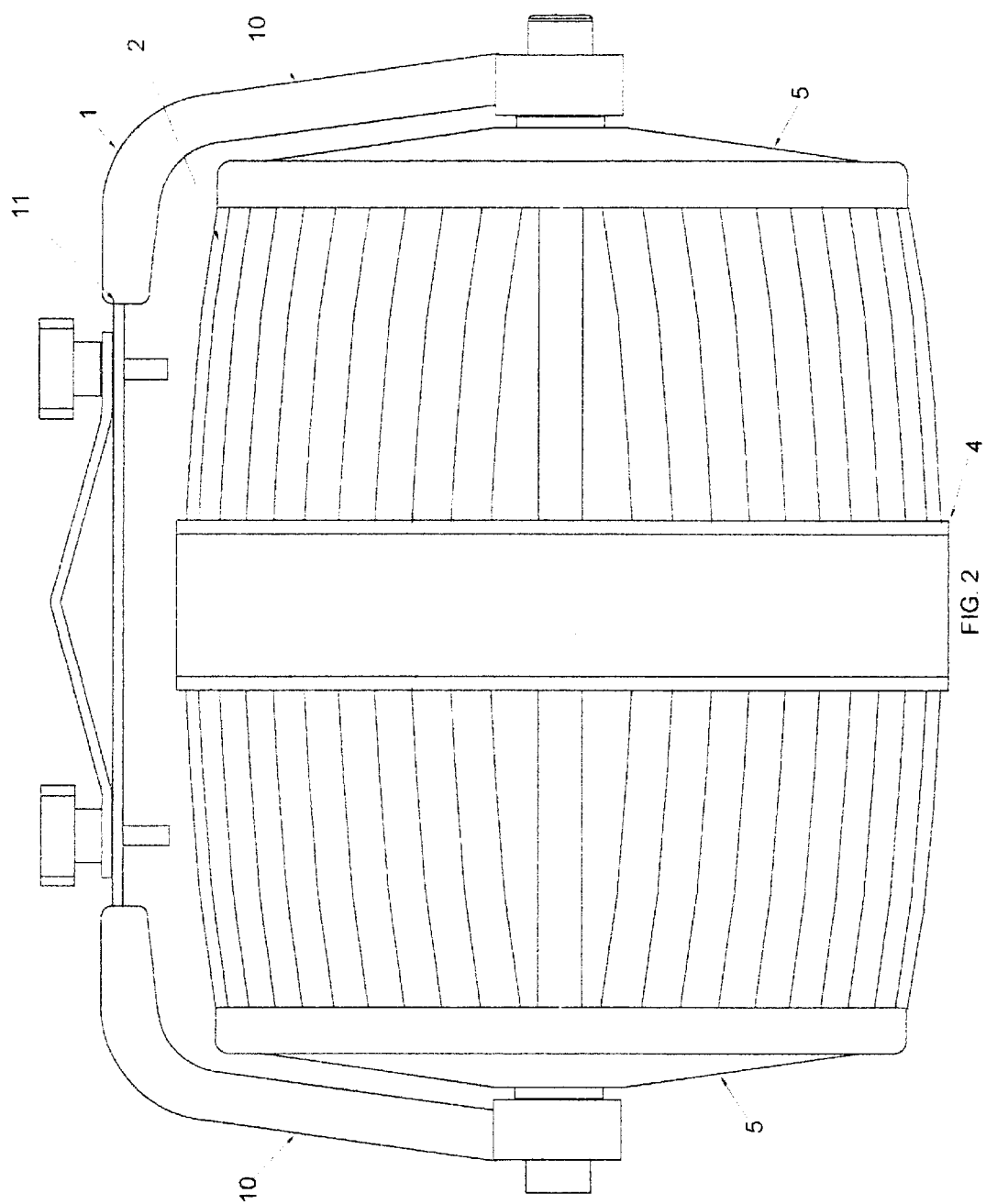
FIG. 2 is a front elevation of the drive unit.
Figure 3:
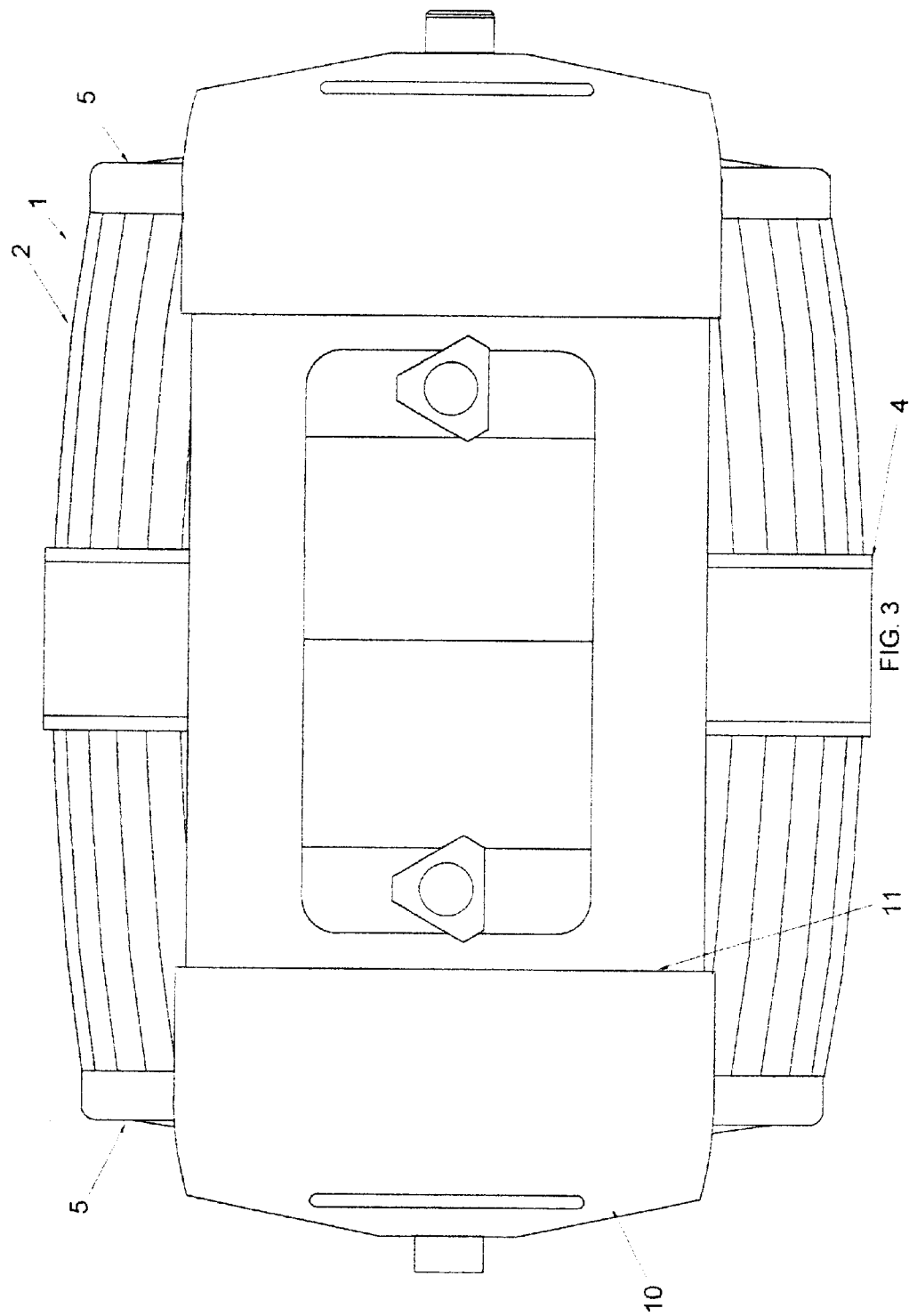
FIG. 3 is a plan view of FIG. 2.
Figure 4:
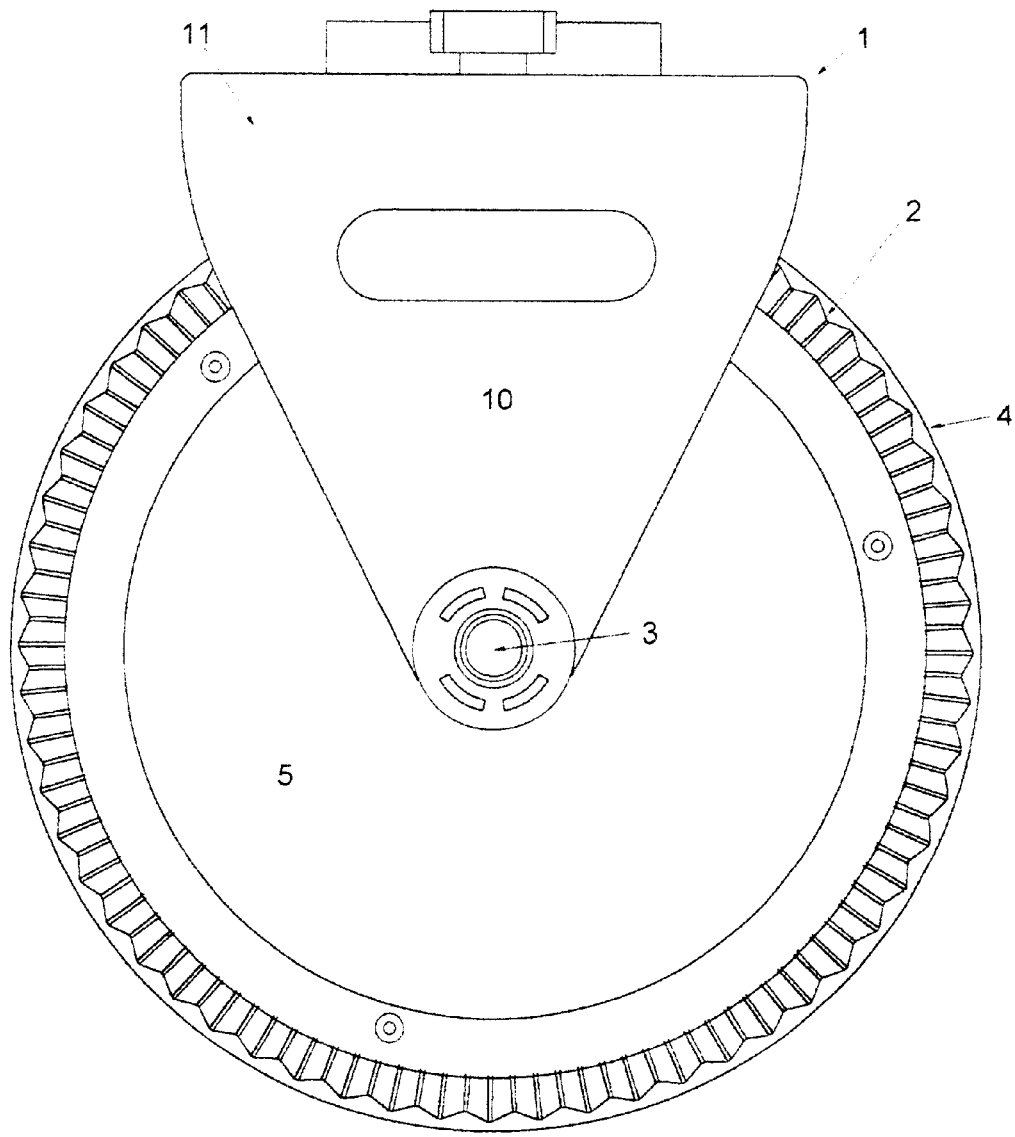
FIG. 4 is an end elevation of the drive unit.

A power drive unit 1 for attachment to a golf trolley (not shown) comprises a drum 2 rotatable about a generally horizontal axis 3 with an external periphery 4 of the drum adapted to seat on the ground and to make frictional contact with the ground for drive purposes, whilst end caps 5 close off the ends of the drum 2. Within the drum 2 is housed and suspended chassis 6 by means of pins 7 projecting from end walls 8 of the chassis and passing through a bearing collar 9 fixed to the inside of each end cap 5, to the outside of each end cap 5, where the pin is attached to one arm 10 of a yoke 11 by which the unit 1 is releasably attachable to a golf trolley. The yoke 11 also comprises a top plate 12 with a centering block 13, a clamp 14 and two spaced-apart clamp screws 15.

The chassis carries an electric battery 16 secured by a strap 17, the battery having terminals 18. The chassis 6 also carries an electric motor 19 powerable from the battery 16, a speed controller 20 and a relay 21.

A transmission 22 extends from the drive motor 19 to the drum 2 and comprises a first, belt stage with a belt 23 driving an idler gear 24 rotatably mounted on a pin 25 carried by one end wall 8 of the chassis 6. A second stage comprises a spur gear 26 in mesh with an output gear 27, all the gears being of acetal copolymer.

In accordance with the invention, three drive pegs 28, spaced 120° apart, project inwardly from the inside of each end cap 5, whilst both end caps 5 are identical, only one is used for drive purposes.

To receive the pegs 28, the output gear 27 is provided with three 120° apertures 30 each housing a ring or sleeve 31 of resilient material such as neoprene or rubber.

Not shown are manually operable means for controlling forward rotation of the drum.

In addition, an air gap 32 is provided between the output gear 27 and the end cap 5 which minimises any noise transmission from the interior of the drum 2 to the outside.

What is claimed is:

1. A power drive unit for attachment to a golf trolley comprising:
   (i) a drum rotatable about a generally horizontal axis with an external periphery of said drum adapted to seat on the ground and to make frictional contact with the ground for drive purposes,
   (ii) a battery within said drum,
   (iii) an electric drive motor powerable from said battery,
   (iv) a transmission from said drive motor to said drum,
   (v) manually operable control means for controlling forward rotation of said drum,
   (vi) an end cap at each end of said drum, and
   (vii) a final, output gear mechanically connected to one of said end caps via a vibration isolating connection.

2. A drive unit as claimed in claim 1, wherein an air gap is provided between said final, output gear and said mechanically connected end cap.

3. A drive unit as claimed in claim 1, wherein a yoke bridges co-axial stub shafts, by which yoke said unit is attachable to a golf trolley.

4. A drive unit as claimed in claim 3, wherein said yoke comprises a top plate, and a pair of side arms.

5. A drive unit as claimed in claim 4, wherein said top plate incorporates a centering block and a clamp.

6. A drive unit as claimed in claim 1, wherein said battery is a lead/acid battery.

7. A drive unit as claimed in claim 3, wherein said battery is carried within said drum by a chassis and secured therein by at least one battery strap.

8. A drive unit as claimed in claim 7, wherein said chassis is carried by said stub shafts, which project from end walls of said chassis and pass one through each end cap of said drum to be attached to side arms of said yoke.

9. A drive unit as claimed in claim 7, wherein said chassis also carries said electric drive motor, a speed controller, and a relay.

10. A drive unit as claimed in claim 7, wherein said electric drive motor has an output shaft carrying a pulley to a belt of a first stage of said transmission, said belt driving an idler gear rotatably mounted on a pin carried by one side wall of said chassis, said idler gear having a spur gear in mesh with said final, output gear, to form a second stage of said transmission.

11. A drive unit as claimed in claim 10, wherein said gears are of acetal copolymer.

12. A drive unit as claimed in claim 10, wherein said mechanical connection of said end cap to said final, output gear is by drive pegs of one member engaging recesses of the other.

13. A drive unit as claimed in claim 12, wherein said isolating connection comprises a sleeve of resilient material mounted on each peg and engageable with at least a portion of said recesses.

14. A drive unit as claimed in claim 13, wherein said resilient sleeve is of neoprene.

15. A drive unit as claimed in claim 1, wherein said manually operable control means also controls reverse rotation of said drum.

* * * * *